United States Patent Office 3,534,043
Patented Oct. 13, 1970

3,534,043
ESTERS OF 6 - ALKENYLOXY - 7 - SUBSTITUTED-ALKOXY - 4 - HYDROXYQUINOLINE - 3 - CARBOXYLIC ACIDS
Raymond Alexander Bowie and Mervyn Stewart Grant, Macclesfield, England, assignors to Imperial Chemical Industries Limited, London, England, a corporation of Great Britain
No Drawing. Filed Aug. 17, 1967, Ser. No. 661,234
Claims priority, application Great Britain, Sept. 19, 1966, 41,718/66
Int. Cl. C07d 33/34
U.S. Cl. 260—287                  6 Claims

ABSTRACT OF THE DISCLOSURE

New 4-hydroxyquinoline-3-carboxylic esters in which the quinoline nucleus is substituted in the 7-position by an alkoxy, alkoxyalkoxy, aryloxyalkoxy or aralkoxy radical, and in the 6-position by an alkenyloxy radical. The novel products are useful for the prophylactic treatment of coccidiosis in poultry.

---

This invention relates to quinoline derivatives which possess anti-coccidial activity.

According to the invention we provide quinoline derivatives of the formula:

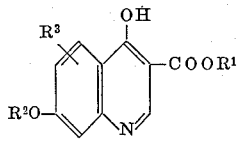

wherein $R^1$ stands for an alkyl or alkenyl radical, $R^2$ stands for an alkyl radical of at least 5 carbon atoms, an alkoxyalkyl radical, or an aryloxyalkyl or aralkyl radical the aryl nucleus of either of which optionally bears one or more substituents selected from halogen atoms and alkyl and alkoxy radicals, and $R^3$ stands for an alkenyloxy radical.

It is to be understood that the above definition of quinoline derivatives encompasses the quinoline derivatives when they are present in the tautomeric structure having the formula:

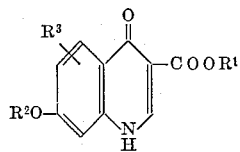

As a suitable value for $R^1$ when it stands for an alkyl radical there may be mentioned for example, an alkyl radical of not more than 6 carbon atoms, for example the methyl or ethyl radical, and as a suitable value for $R^1$ when it stands for an alkenyl radical there may be mentioned for example, an alkenyl radical of not more than 6 carbon atoms, for example the allyl radical.

As a suitable value for $R^2$ when it stands for an alkyl radical of at least 5 carbon atoms there may be mentioned, for example, an alkyl radical of 5–16 carbon atoms, particularly an alkyl radical of 6–14 carbon atoms, for example the n-octyl or n-dodecyl radical. As a suitable value for $R^2$ when it stands for an alkoxyalkyl radical there may be mentioned, for example an alkoxyalkyl radical of not more than 6 carbon atoms, for example the β-ethoxyethyl radical.

As a suitable value for $R^2$ when it stands for an aryloxyalkyl or aralkyl radical, there may be mentioned, for example an aryloxyalkyl or aralkyl radical of not more than 15 carbon atoms, for example the β-phenoxyethyl or benzyl radical. As suitable optional substituents which may be present on the aryl nucleus of $R^2$ when it stands for an aryloxyalkyl or aralkyl radical, there may be mentioned, for example, chlorine atoms and methyl and methoxy radicals. Thus a specific value for $R^2$ is the 2,4-dichlorobenzyl, β-(p-methylphenoxy)ethyl or β-(p-methoxyphenoxy)ethyl radical.

As a suitable value for $R^3$ there may be mentioned, for example, an alkenyloxy radical of not more than 6 carbon atoms, for example the allyloxy or 2-methylallyloxy radical. A preferred value for $R^3$ is an alkenyl radical of not more than 6 carbon atoms in the 6-position of the quinoline nucleus, for example the 6-allyloxy or 6-(2-methylallyloxy) radical.

As a specific quinoline derivative of the invention there may be mentioned, for example, ethyl 6-allyloxy-7-benzyloxy-4-hydroxyquinoline-3-carboxylate, ethyl 7-benzyloxy-6 - (2-methylallyloxy)-4-hydroxyquinoline-3-carboxylate, methyl 6 - allyloxy-7-benzyloxy-4-hydroxyquinoline-3-carboxylate, methyl 6 - allyloxy - 7-n-dodecyloxy-4-hydroxyquinoline-3-carboxylate, methyl 6 - allyloxy-7-β-phenoxyethoxy-4- hydroxyquinoline-3-carboxylate, methyl 6-allyloxy - 7 - (2,4-dichlorobenzyloxy)-4-hydroxyquinoline-3-carboxylate, methyl 6 - allyloxy-7-β-(p-methylphenoxy) ethoxy-4-hydroxyquinoline-3-carboxylate, methyl 6-allyloxy - 7 - n - octyloxy-4-hydroxyquinoline-3-carboxylate, methyl 6-allyloxy-7-β-ethoxyethoxy-4-hydroxyquinoline-3-carboxylate, methyl 6-allyloxy-7-β-(p-methoxyphenoxy)-ethoxy-4-hydroxyquinoline-3-carboxylate or ethyl 6-allyloxy-7-β-phenoxyethoxy-4-hydroxyquinoline-3-carboxylate, and of these, preferred compounds are the first four and the sixth compound.

According to a further feature of the invention we provide a process for the manufacture of the quinoline derivatives of the invention which comprises the cyclisation of an anil of the formula:

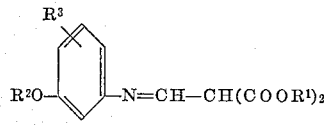

wherein $R^1$, $R^2$ and $R^3$ have the meanings stated above, by interaction of the anil with a phosphorus oxyhalide, for example phosphorus oxychloride, followed, if necessary, by hydrolysis of the 4-substituted quinoline derivatives so formed.

According to a further feature of the invention we provide a process for the manufacture of the quinoline derivatives of the invention which comprises the esterification of an acid of the formula:

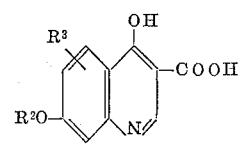

wherein $R^2$ and $R^3$ have the meanings stated above, with an alcohol of the formula $R^1.OH$, wherein $R^1$ has the meaning stated above.

The esterification may conveniently be carried out by conventional means, for example by the interaction of the alcohol of the formula $R^1.OH$ with the above-mentioned acid in the presence of a mineral acid catalyst, for example sulphuric acid or hydrochloric acid; or by the interaction of the said alcohol of the formula $R^1.OH$ with an activated derivative of the above-mentioned acid, for example the acid halide, for example the acid chloride.

The above-mentioned acid of the formula:

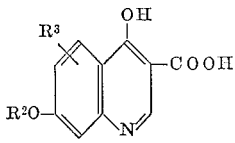

used as starting material in the above process may be obtained by the hydrolysis of the corresponding ester of the formula:

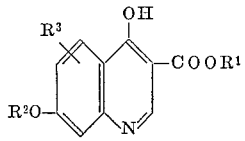

wherein $R^1$, $R^2$ and $R^3$ have the meanings stated above.

The hydrolysis may be carried out under acidic conditions, for example, in the presence of an inorganic acid, for example hydrochloric acid, or it may be carried out under basic conditions, for example, in the presence of an inorganic base, for example an alkali metal hydroxide, for example sodium hydroxide or potassium hydroxide. The hydrolysis may conveniently be carried out in the presence of a diluent or solvent, for example ethanol, water or acetone, and it may be accelerated or completed by the application of heat.

As stated above, the quinoline derivatives of this invention possess valuable anti-coccidial properties. They are especially active against the intestinal species *Eimeria brunetti*, and certain of them are also active against the caecal species *E. tenella* and *E. necatrix*. They are therefore useful as the active ingredient in veterinary compositions such as concentrated food pre-mixes or medicated foodstuffs to be used for the prophylactic treatment of coccidiosis in poultry or other domestic animals.

According to a further feature of the invention, therefore, we provide veterinary compositions comprising at least one of the quinoline derivatives of the invention together with a non-toxic diluent or carrier.

The veterinary compositions may be, for example, concentrated food pre-mixes wherein the active ingredient is mixed with an inert diluent, for example kaolin, talc, calcium carbonate, fuller's earth, attapulgus clay or ground oyster shells, or is mixed with a foodstuff as diluent, for example whole ground corn, corn distillers dry grain, wheat shorts or corn cob meal. It is intended that the said pre-mixes should be further diluted with an animal foodstuff in order to provide a suitable medicated foodstuff which can be eaten directly by poultry or other domestic animals. It is preferred that said medicated foodstuff compositions intended for direct feeding to poultry should contain between about 0.0001% and about 0.1% by weight of active ingredient in the composition, and more particularly between 0.0005% and 0.005% by weight in the food of the preferred active ingredients. It is likewise preferred that the concentrated pre-mixes should contain between about 0.1% and about 25% by weight of the active ingredient and more particularly between 0.2% and 5% by weight of the preferred active ingredients.

The compositions of the invention may additionally contain one or more other compounds of known veterinary utility, for example one or more known coccidiostats, anthelmintics, or growth promotors, anti-bacterials or tranquilisers.

The invention is illustrated but not limited by the following examples in which the parts are by weight:

EXAMPLE 1

A mixture of 42.5 parts of diethyl 3-benzyloxy-4-allyloxyanilinomethylenemalonate and 230 parts of phosphorus oxychloride is heated at 100° C. for 3.5 hours. Most of the excess phosphorus oxychloride is distilled off under reduced pressure and the residue is poured into a concentrated ammonia solution containing ice. A semi-solid is obtained which is filtered off and crystallised from a mixture of benzene and acetone. There is thus obtained ethyl 4-chloro-6-allyloxy-7-benzyloxyquinoline-3-carboxylate, M.P. 173–174° C. A mixture of 5 parts of this chloro compound, 160 parts of absolute ethanol and 2.36 parts of concentrated hydrochloric acid is heated under reflux for 7½ hours, and then allowed to cool overnight. The resulting solid is filtered off and crystallised from dimethylformamide. There is thus obtained ethyl 6-allyloxy-7-benzyloxy-4-hydroxyquinoline-3-carboxylate, M.P. 248–249° C.

The diethyl 3-benzyloxy-4-allyloxyanilinomethylenemalonate may be obtained as follows:

29.0 parts of 3-benzyloxy-4-allyloxyaniline hydrochloride is treated with excess 2 N-ammonium hydroxide, and the mixture is extracted with ether. The ethereal extracts are dried, filtered and evaporated to dryness. To the residue is added 48 parts of absolute ethanol, followed by 21.6 parts of diethyl methoxymethylenemalonate, and the mixture is heated under reflux for 4 hours. The absolute ethanol is evaporated, and there is thus obtained diethyl 3-benzyloxy-4-allyloxyanilinomethylenemalonate as an oil.

The 3-benzyloxy-4-allyloxyaniline hydrochloride may be obtained as follows:

A mixture of 28.5 parts of 3-benzyloxy-4-allyloxynitrobenzene, 478 parts of absolute ethanol, 143 parts of zinc dust, 7.8 parts of calcium chloride, and 185 parts of water is heated under reflux for 4 hours, then filtered hot and the filtrate evaporated under reduced pressure. Dilute hydrochloric acid is added to the residue, and the resultant solid is crystallised from water. There is thus obtained 3-benzyloxy-4-allyloxyaniline hydrochloride, M.P. 183–184° C.

The 3-benzyloxy-4-allyloxynitrobenzene may be obtained as follows:

A mixture of 24.5 parts of 2-benzyloxy-4-nitrophenol, 14.4 parts of anhydrous potassium carbonate, 20 parts of allyl bromide, and 48 parts of methyl ethyl ketone is heated under reflux for 40 hours, then filtered hot, and the filtrate evaporated under reduced pressure. The residue is crystallised from ethanol and there is thus obtained 3-benzyloxy-4-allyloxynitrobenzene, M.P. 70–71° C.

EXAMPLE 2

The procedure described in Example 1 is repeated except that the 42.5 parts of diethyl 3-benzyloxy-4-allyloxyanilinomethylenemalonate are replaced by 43.9 parts of diethyl 3-benzyloxy-4-(2-methylallyloxy)anilinomethylenemalonate. There is thus obtained ethyl 7-benzyloxy-6-(2-methylallyloxy)-4-hydroxyquinoline-3-carboxylate, M.P. 249–250° C.

The diethyl 3-benzyloxy-4-(2-methylallyloxy)anilinomethylenemalonate may be obtained as described in Example 1 except that the 29 parts of 3-benzyloxy-4-allyloxyaniline hydrochloride are replaced by 30.5 parts of 3-benzyloxy-4-(2-methylallyloxy)aniline hydrochloride. There is thus obtained diethyl 3-benzyloxy-4-(2-methylallyloxy)anilinomethlenemalonate as an oil.

The 3-benzyloxy-4-(2-methylallyloxy)aniline hydrochloride may be obtained as described in Example 1 except that the 28.5 parts of 3-benzyloxy-4-allyloxynitrobenzene are replaced by 29.9 parts of 3-benzyloxy-4-(2-methylallyloxy)nitrobenzene. There is thus obtained 3-benzyloxy-4-(2-methylallyloxy)aniline hydrochloride, M.P. 197–198° C.

The 3-benzyloxy-4-(2-methylallyloxy)nitrobenzene may be obtained as described in Example 1 except that the 20 parts of allyl bromide are replaced by 15 parts of 2-methylallyl chloride and the reflux period is changed from 16 hours to 6 days. There is thus obtained 3-benzyloxy-4-(2-methylallyloxy)nitrobenzene, M.P. 69–70° C.

EXAMPLE 3

A mixture of 39.7 parts of dimethyl 3-benzyloxy-4-allyloxyanilinomethylenemalonate and 180 parts of phosphorus oxychloride is heated at 100° C. for 3.5 hours. The excess of phosphorus oxychloride is distilled off under reduced pressure and to the residue is added 200 parts of pure methanol and 2 parts of concentrated hydrochloric acid. The mixture is heated under reflux for 8 hours, and then allowed to cool overnight. The resulting solution is poured onto ice, and the precipitated solid is filtered off and crystallised from dimethylformamide. There is thus obtained methyl 6-allyloxy-7-benzyloxy-4-hydroxyquinoline-3-carboxylate, M.P. 241–243° C.

The dimethyl 3-benzyloxy-4-allyloxyanilinomethylenemalonate may be obtained as described in Example 1 except that the 21.6 parts of diethyl methoxymethylenemalonate and the 48 parts of absolute ethanol are replaced respectively by 17.5 parts of dimethyl methoxymethylenemalonate and 80 parts of pure methanol. There is thus obtained dimethyl 3-benzyloxy-4-allyloxyanilinomethylenemalonate, as an oil.

EXAMPLE 4

The process described in the first part of Example 3 is repeated except that the 39.7 parts of the anil are replaced by an equimolar amount of an anil of the general formula:

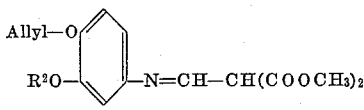

and there is thus obtained a quinoline derivative of the formula:

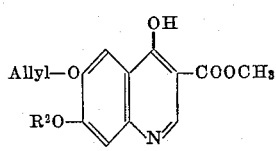

The following quinoline derivatives may be thus obtained:

| R² | Melting point ° C. |
| --- | --- |
| n-Dodecyl | 230 |
| β-Phenoxyethyl | 238–240 |
| 2,4-Dichlorobenzyl | 260 |
| β-(p-Methylphenoxy)ethyl | 247–248 |
| n-Octyl | 230–232 |
| β-Ethoxyethyl | 235–237 |
| β-(p-Methoxyphenoxy)ethyl | 241–243 |

By repeating the process described in the first part of Example 1 except that the 42.5 parts of the anil are replaced by 43.9 parts of diethyl 3-β-phenoxyethoxy-4-allyloxyanilinomethylenemalonate, there is thus obtained ethyl 6-allyloxy-7-β-phenoxyethoxy-4-hydroxyquinoline-3-carboxylate, M.P. 240–241° C.

The anils used as starting materials may be obtained by condensation of the corresponding aniline derivatives with either diethyl methoxymethylenemalonate, as described in Example 1, or with dimethyl methoxymethylenemalonate, as described in Example 3.

The corresponding aniline derivatives may be obtained as follows:

3-n-dodecyloxy-4-allyloxyaniline

A solution of 5.6 parts of potassium hydroxide in 16 parts of water is added to a solution of 15.5 parts of 4-nitro-1,2-dihydroxybenzene in 84 parts of 2-ethoxyethanol, and the mixture is stirred while 18.2 parts of allyl bromide are added. The resulting mixture is heated under reflux for 24 hours, cooled, and then poured into 800 parts of iced water. The aqueous suspension is stirred for 3 hours, filtered, and the solid crystallised from benzene to give 2-allyloxy-5-nitrophenol, M.P. 85–87° C. A mixture of 19.5 parts of this latter nitrophenol derivative, 15 parts of anhydrous potassium carbonate, 27.4 parts of n-dodecyl bromide and 160 parts of acetone is heated under reflux for 3 days. The mixture is then filtered hot, and the filtrate is evaporated. The residue is dissolved in ether, and the solution is washed successively with 2 N-aqueous sodium hydroxide, brine and water. The ethereal solution is then dried and evaporated to give 3-n-dodecyloxy-4-allyloxynitrobenzene, M.P. 31–33° C. This latter nitro compound is reduced to 3-n-dodecyl-4-allyloxyaniline by repeating the process described in Example 1, except that the 28.5 parts of 3-benzyloxy-4-allyloxynitrobenzene are replaced by 36.3 parts of 3-n-dodecyloxy-4-allyloxynitrobenzene.

3-β-phenoxyethoxy-4-allyloxyaniline
3-(2,4-dichlorobenzyloxy)-4-allyloxyaniline
3-β-(p-methylphenoxy)ethoxy-4-allyloxyaniline
3-n-octyloxy-4-allyloxyaniline
3-β-ethoxyethoxy-4-allyloxyaniline
3-β-(p-methoxyphenoxy)ethoxy-4-allyloxyaniline:

The above aniline derivatives may be obtained by repeating the process described above for the preparation of 3-n-dodecyloxy-4-allyloxyaniline, except that the 27.4 parts of n-dodecyl bromide are replaced by 22 parts of β-phenoxyethyl bromide, 21 parts of 2,4-dichlorobenzyl chloride, 23 parts of β-(p-methylphenoxy)ethyl bromide, 21 parts of n-octyl bromide, 17 parts of β-ethoxyethyl bromide or 25 parts of β-(p-methoxyphenoxy)ethyl bromide respectively.

EXAMPLE 5

A mixture of 5 parts of 7-n-dodecyloxy-6-allyloxy-4-hydroxyquinoline-3-carboxylic acid and 35 parts of thionyl chloride is heated under reflux for 2 hours with a catalytic amount of pyridine. The excess of thionyl chloride is evaporated and 25 parts of benzene are added to the residue. The mixture is evaporated to dryness, and the solid acid chloride so obtained is heated under reflux for 1 hour with 50 parts of dry methanol, and the solution is then evaporated. The solid residue is heated at 100° C. for a few minutes with 50 parts of water, and the resulting mixture cooled and filtered. The solid product is crystallised from dimethylformamide. There is thus obtained methyl 7-n-dodecyloxy-6-allyloxy-4-hydroxyquinoline-3-carboxylate, M.P. 230° C.

The 7-n-dodecyloxy-6-allyloxy - 4 - hydroxyquinoline-3-carboxylic acid used as starting material may be obtained as follows:

A mixture of 34 parts of methyl 7-n-dodecyloxy-6-allyloxy-4-hydroxyquinoline-3-carboxylate and 200 parts of 10% w./v. potassium hydroxide solution is heated under reflux for 2 hours. A little charcoal is added, and the hot mixtures is filtered. The filtrate is acidified with hydrochloric acid, and the precipitated solid is filtered off, washed with water, dried in vacuo at 100° C. for 18 hours, and recrystallised from dimethylformamide. There is thus obtained 7-n-dodecyloxy-6-allyloxy-4-hydroxyquinoline-3-carboxylic acid, M.P. 249–251° C.

EXAMPLE 6

1 part of 7-n-dodecyloxy-6-allyloxy-4-hydroxyquinoline-3-carboxylic acid is heated under reflux with a solution of 1 part of concentrated sulphuric acid in 50 parts of methanol for 24 hours. The cooled solution is diluted with water, and the separated solid is washed with methanol and crystallised from dimethylformamide. There is thus obtained methyl 7-n-dodecyloxy-6-allyloxy - 4 - hydroxyquinoline-3-carboxylate, M.P. 230° C.

EXAMPLE 7

3 parts of methyl 6-allyloxy-7-benzyloxy-4-hydroxyquinoline-3-carboxylate and 97 parts of whole ground corn are thoroughly mixed in a blending machine. There is thus obtained a concentrated food pre-mix which may be mixed in suitable proportions with an animal foodstuff so that the medicated foodstuff so obtained can be fed to poultry for the prophylactic control of coccidiosis.

The whole ground corn in the above pre-mix may be replaced by corn distillers dry grain, wheat shorts, corn cob meal, fuller's earth, calcium carbonate, attapulgus clay or ground oyster shells.

The active ingredient in the above pre-mix may be replaced by any of the quinoline derivatives specifically described in this specification.

EXAMPLE 8

1 part of a concentrated food pre-mix, obtained as described in Example 7, is uniformly dispersed in 2,000 parts of commercial poultry starting mash. There is thus obtained a medicated foodstuff suitable for feeding to poultry for the prophylactic control of coccidiosis.

What we claim is:

1. A substituted quinoline-3-carboxylic ester of the formula:

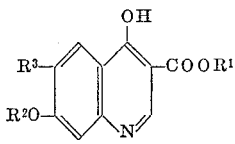

wherein R' is selected from the group consisting of methyl, ethyl and allyl, R² is selected from the group consisting of n-octyl, n-dodecyl, β-phenoxyethyl, benzyl, 2,4-dichlorobenzyl, β-(p-methylphenoxy)ethyl and β-(p-methoxyphenoxy)ethyl, and R³ is selected from the group consisting of allyloxy and 2-methylallyloxy.

2. A compound as claimed in claim 1 which is ethyl 6-allyloxy-7-benzyloxy-4-hydroxyquinoline-3-carboxylate.

3. A compound as claimed in claim 1 which is ethyl 7-benzyloxy-6-(2-methylallyloxy) - 4 - hydroxyquinoline-3-carboxylate.

4. A compound as claimed in claim 1 which is methyl 6-allyloxy-7-benzyloxy-4-hydroxyquinoline-3-carboxylate.

5. A compound as claimed in claim 1 which is methyl 6-allyloxy-7-n-dodecyloxy - 4 - hydroxyquinoline - 3 - carboxylate.

6. A compound as claimed in claim 1 which is methyl 6-allyloxy-7-(2,4-dichlorobenzyloxy) - 4 - hydroxyquinoline-3-carboxylate.

References Cited

UNITED STATES PATENTS 3,290,315 12/1966 Watson _____ 260—287
3,414,576 12/1968 Cairns et al. _____ 260—287

OTHER REFERENCES

Br. 942, 524 (Norwich), November 1963, Abstracted in Chem. Abst., vol. 60, cols. 5468–9.

DONALD G. DAUS, Primary Examiner

U.S. Cl. X.R.

260—286, 471, 575, 612; 424—258